United States Patent [19]

Blackmore

[11] 4,322,301

[45] Mar. 30, 1982

[54] DRILLING FLUID COMPOSITION

[75] Inventor: Kenneth A. E. Blackmore, Bellingham, Wash.

[73] Assignee: Georgia-Pacific Corporation, Portland, Oreg.

[21] Appl. No.: 158,243

[22] Filed: Jun. 10, 1980

[51] Int. Cl.$^3$ .............................................. C09K 7/02
[52] U.S. Cl. .............................. 252/8.5 A; 252/8.5 C
[58] Field of Search .................... 252/8.5 A, 8.5 C; 260/17.5

[56] References Cited

U.S. PATENT DOCUMENTS

| | | | |
|---|---|---|---|
| 2,334,051 | 11/1943 | Wayne | 252/8.5 |
| 2,414,647 | 1/1947 | Hoeppel | 252/8.5 |
| 2,552,775 | 5/1951 | Fischer | 252/8.5 |
| 2,605,221 | 7/1952 | Hoeppel | 252/8.5 |
| 2,935,473 | 5/1960 | King et al. | 252/8.5 |
| 3,985,659 | 10/1976 | Felicetta et al. | 252/8.5 |

FOREIGN PATENT DOCUMENTS 2329082 1/1975 Fed. Rep. of Germany .

OTHER PUBLICATIONS

Types of Drilling Mud, Section 300 of Baroid Drilling Mud Data Book, pub. by Baroid Division of National Lead Company.
Chemical Treatment of Drilling Mud, Section 600 of Baroid Drilling Mud Data Book, by Baroid Division of National Lead Company.
Chaney et al., "The Chemical Treatment of Drilling Fluids", publication by Magnet Cove Barium Corp. of Houston, Texas.

Primary Examiner—Herbert B. Guynn
Attorney, Agent, or Firm—Schuyler, Banner, Birch, McKie & Beckett

[57] ABSTRACT

A water-based drilling fluid composition is described which comprises an aqueous dispersion of a clay material containing, in the presence of a phosphate or a particular metal or both, an effective dispersing amount of a lignosulfonate modified by graft polymerization with acrylic acid.

48 Claims, No Drawings

DRILLING FLUID COMPOSITION

This invention pertains to a drilling fluid composition. More particularly, it pertains to a drilling fluid composition comprising a graft copolymer having an average molecular weight of less than 80,000 of lignosulfonate and acrylic acid or derivatives thereof to which a phosphate or a particular metal or both are added to enhance the properties of the copolymer to make them especially useful in drilling fluids.

Water-based drilling fluids have been widely used to drill subterranean wells such as oil and gas wells. These drilling fluids are often referred to as "drilling muds" because they comprise an aqueous dispersion of clay material. Such dispersions are thixotropic and it was found that certain lignosulfonates improved the properties thereof, and such lignosulfonates came to be called "thinners" since, among other things, they function to reduce the effective viscosity of the drilling fluid under drilling conditions. The history and function of such drilling fluids are described in more detail in U.S. Pat. No. 2,935,473. This patent discloses and claims a major innovation in lignosulfonate thinners, namely the use of certain heavy metal salts of lignosulfonate wherein the metals are chromium, aluminum, iron, copper, or a combination thereof, which salts may or may not be oxidized. Of the metal lignosulfonate salts, the chromium salt has been most effective and has been mainly used by itself or mixed with other metals. While the thermal stability of these additives, especially the chromium salt, has been sufficient to meet the requirements for most of the wells drilled, further improvement is desirable in view of the increase in the depth of the wells presently being drilled. The availability of oil and gas at readily accessible locations has diminished making it necessary to drill wells to deeper levels. As the drilling depth increases, the temperature increases so that the drilling fluids are commonly subjected to temperatures of 250° F. and above to as high as about 500° F.

Polyacrylates, such as acrylic telomers are disclosed in U.S. Pat. No. 2,911,365 as being effective as a dispersant in muds. These polymers are prepared in the presence of a halogenated alkane, such as a halomethane, which enters into the polymer. Also, U.S. Pat. No. 2,552,775 discloses the use of a polyacrylic acid having a molecular weight in the range of from 5,000 to 50,000 in drilling fluids. The use of low-molecular weight acrylic acid polymers, having a molecular weight of less than 2,500 is disclosed in U.S. Pat. No. 3,764,530. In the latter patent, it is disclosed that the low-molecular weight acrylic acid polymers are thermally stable and may be used in high-temperature drilling fluids. It also discloses that the low-molecular weight acrylic acid homopolymer may likewise be added to chrome lignosulfonate-containing muds to reduce the thermal degradation of the drilling fluid and enhance the effectiveness of the mixture in high-temperature muds. While the polyacrylic acid or polyacrylate drilling fluids may have enhanced thermal stability, generally the acrylic acid or acrylate drilling fluids are not as effective as desired in the presence of contamination or in treated muds such as salt water, gyp, or other muds.

A drilling fluid composition comprising a copolymer of lignosulfonate and acrylic compounds is disclosed in a patent application Ser. No. 157,876 filed June 9, 1980, by co-worker, Jack R. Kelley. The drilling fluid composition containing the additive has a thermal stability exceeding that of drilling fluid treated with the present day chromium lignosulfonate additives and is about as effective as the chromium additive containing drilling fluids in many mud systems except gypsum and other contaminated drilling fluids.

It is, therefore, an object of this invention to provide an effective drilling fluid composition. Another object is to provide a drilling fluid composition having an enhanced thermal stability and which is effective in muds such as seawater muds and gypsum-containing drilling fluids. A further object is to provide a drilling fluid composition treated with a graft copolymer of acrylic acid and lignosulfonate having enhanced thermal stability and effectiveness in seawater, gypsum-containing muds and other treated or contaminated drilling fluids.

The above and other objects are obtained by this invention which comprises using an effective dispersing amount of a mixture of a water-soluble phosphate compound and a reaction product of lignosulfonate and an acrylic compound selected from the group consisting of acrylic acid, acrylonitrile, acrylamide, and other acrylic acid derivatives such as the methyl and ethyl esters of acrylic acid in an aqueous drilling fluid composition containing a clay material. The reaction product of lignosulfonate and the acrylic compound is a copolymer of lignosulfonate and the acrylic compound having a weight average molecular weight not exceeding about 80,000. The drilling fluid composition containing the phosphate has a good thermal stability exceeding that of present day chromium-containing drilling fluids and is about as effective as the chromium-containing drilling fluids in contaminated muds such as seawater and gypsum-containing drilling fluids. Improvements in thinning of drilling fluids in the presence of certain clay and shale contaminants can be obtained in the presence of limited amounts of water-soluble compounds of metals, such as iron, copper, zinc, titanium, chromium and manganese.

The lignosulfonate-acrylic acid copolymer utilized herein is obtained by reaction or polymerization of the acrylic compound with the lignosulfonate using conventional grafting techniques of polymerizing vinyl monomers to polymers with free radical type reactions. The reaction is preferably carried out by polymerization of the acrylic compound with the lignosulfonate in an aqueous medium. In carrying out the reaction with free radical generation, an association of the acrylic compound with the lignosulfonate is obtained characteristic of graft type copolymers. Preferably, free radical initiators such as benzoyl peroxide, alphazobisisobutyronitrile, cumene hydroperoxide, and other free radical initiators such as a hydrogen peroxide-metal redox system may be used.

Lignosulfonates obtained from any source may be used for the polymerization with the acrylic compound. Lignins are polymeric substances composed of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp. The residual pulping liquors containing the lignin as by-products are, thus, one of the main sources of lignins. While there is some variation in the chemical structure of lignin, depending upon the plant from which lignin is obtained, place where the plant is grown, and also upon the method used in recovery or isolation of the lignin from the plant tissue, the basic structure and properties of the lignins are similar, all containing an aromatic nucleus through which the reaction may possibly be effected. Thus, lignins obtained by any method or from any source may be used in this reaction as long as the lignin is in a form which may at least be partially soluble in a solvent in which it may be polymerized with the acrylic compound.

Since the lignins separated from the plant may be chemically altered somewhat from that found in the plant, the term "lignins", as used herein, means the lignin products which are obtained upon separation from the cellulose or recovered from the plant. In the sulfite pulping process, the lignocellulosic material is digested with a sulfurous acid-metal bisulfite solution resulting in the sulfonation of the lignins. In other methods for recovery or separation of the lignins from the plant, the lignins may not be sulfonated but may be chemically altered somewhat in some other manner. For example, in residual pulping liquors obtained in the sulfate and other alkaline pulping processes, the lignins are present as alkaline metal salts dissolved in the alkaline aqueous liquor. "Hydrolysis lignin" is obtained from the hydrolysis of lignocellulosic materials found in the plant. The lignin obtained by hydrolysis or by an alkaline pulping process may be sulfonated as well as spent sulfite lignin being further sulfonated. Also, the lignin products such as a residual pulping liquor may be subjected to various treatments such as, for example, acid, alkaline or heat treatment or reacted with the other chemicals which may further alter somewhat the lignin constituents. The lignins remain operative as long as the treatment is not so severe as to destroy the basic aromatic polymeric structure or its reactivity.

The residual pulping liquors, or the lignin-containing product obtained in the separation or recovery of lignins from the plant, will generally contain lignins of various molecular weights varying from less than 1,000 to over 100,000. These liquors also may contain other constituents besides the lignins. For example, in the sulfite pulping process, the spent sulfite liquor contains lignosulfonates which may be present as salts of cations, such as magnesium, calcium, ammonium, sodium and other cations which may have been present during the sulfonation of the lignin. The spent sulfite liquor generally contains only about 40 to 60 weight percent on an oven-dried basis of lignosulfonates with the remainder being carbohydrates and other organic and inorganic constituents dissolved in the liquor. Lignin products obtained by other pulping processes may likewise contain other materials such as carbohydrates, degradation products of carbohydrates, and resinous materials which are separated from the lignocellulosic materials with the lignin. Lignin obtained by hydrolysis of lignocellulosic materials may not contain the carbohydrates but may contain resinous-type materials as well as other materials which are not removed by the hydrolysis. It is not necessary to separate the lignin-containing constituents from the other constituents. The lignin product as obtained containing all of the constituents may be used as such or subjected to different treatments such as alkaline, acid, or heat treatments as well as reacted with chemicals to modify or remove some of the non-lignin constituents prior to the polymerization reactions. Some reaction of the acrylic acid with the non-lignin constituents may be obtained, but the presence of the products of reaction of these constituents is not of sufficient importance to warrant their removal before or after the polymerization. They are generally of lower molecular weight materials and can be easily removed from the final lignosulfonate-acrylic copolymer after reaction if desired using methods, such as dialysis, gel permeation chromatography, chemical precipitation and extraction, or other methods well known in the art for the fractionation and recovery of high molecular weight organic water-soluble polymers from lower molecular weight materials. The lignin materials may also be separated from the non-lignin constituents and fractionated in fractions of various molecular weights prior to reaction with acrylic acid.

The lignosulfonate is polymerized with a minor proportion of the acrylic compound, generally 5 to 30%, to obtain a copolymer having an average molecular weight less than about 80,000 when the reaction is substantially completed. At these molecular weights, the copolymer is readily water soluble and functions as a dispersant, thus may be used as a drilling fluid additive. The copolymers generally used for drilling fluid additives have an average molecular weight in the range of 20,000 to 60,000. The copolymers generally contain acrylic acid in an amount of from 10 to 15 percent. However, the thermal stability improves with the amount of acrylic compound polymerized with the lignosulfonate so that for high temperature use, approaching 475° F., the additives may contain larger amounts of acrylic acid up to 25% and higher.

The phosphate compound used may be any water-soluble phosphoric acid or condensed phosphoric acid compound or salt, such as an ortho-, meta-, or polyphosphate salt. Most commonly, an ammonium or alkali metal phosphate salt is used such as ammonium or alkali metal orthophosphate, hexametaphosphate, tripolyphosphate, or pyrophosphate. Sodium orthophosphate or metaphosphate is preferably used due to their availability and cost. The phosphate may be added to the drilling fluid at any time or in any form. It may be simply added to the drilling fluid when it is prepared or it may be intermixed with the lignosulfonate-acrylic compound copolymer prior to addition. Generally after preparation of the reaction product of lignosulfonate and the acrylic compound, the phosphate may be added to the reaction mixture at the end of the polymerization and dried to obtain a uniformly mixed dry product. This also simplifies preparation of the drilling fluid in the field by requiring only the addition of the mixture instead of mixing the individual components in proper proportions in the field. The amount of the phosphate used is generally in an amount, expressed as phosphorous, of from 0.5 to about 5 weight percent of the reaction product. Preferably the phosphate content is generally maintained in the range of from about 1 to 3%, with the phosphate usually being in the lower range when the heavy metals are used in conjunction with the phosphate.

Generally, the addition of the phosphate enhances the thermal stability of the lignosulfonate-acrylate copolymer and the effectiveness of the product in the presence of salt and gypsum contamination. The presence of or the partial conversion of the lignosulfonate-acrylate copolymer to heavy metals, such as iron, zinc, manganese, titanium, copper, and chromium, generally in limited amounts, greatly improves the dispersing and thinning properties of drilling fluids which are contaminated or treated with non-swelling low-yield clays, shales, and other clay contaminants as may be encountered in drilling through various formations. Iron and some of the other cations may have a negative effect on thermal stability at high temperatures, while the presence of the phosphate may have a negative effect in the presence of certain non-swelling clays or shales. Thus, the amount of the heavy metal cations and phosphate used may be varied with respect to the particular drilling fluid used and the particular contaminations encountered. For certain drilling fluids where thermal stability and stability to contamination against gypsum and salt are desired, phosphate by itself may be used, while in other systems where clay and shale contamination is encountered the heavy metal may be used only. Generally, the heavy metal is added in an amount of at least 0.6 weight percent, based upon the weight of the copolymer or reaction product. The amount of the metal may be increased to 10% or more, but generally the amount used is limited to 5 weight percent. Preferably, the amount is in the range of 1.5 to 3.5 percent. At the preferred metal concentrations, the additive is still sufficiently thermally stable and with the addition of phosphate, effective for most drilling fluid systems and contaminants which may be encountered in drilling operations. Of the heavy metals, iron is preferred.

The heavy metal, as a water-soluble compound, may be intermixed with the phosphate-treated polymer as an aqueous solution or intermixed dry with the polymer and the phosphate. For convenience, the metal compound may be added to the copolymer after the condensation or polymerization and prior to or after the phosphate addition, if the phosphate is added. Other methods of adding heavy metal and phosphate to the polymer may be used as long as the conditions are such that the metal is not rapidly precipitated out as an insoluble phosphate salt. When the metal compound is added to a solution of the polymer containing phosphate, possibly some of the metal may become associated with the phosphate to form a fine insoluble salt which remains dispersed in the mixture. After setting for some time, some gel can be obtained upon centrifugation which is believed to be the insoluble phosphate salt with occluded polymer. Without the presence of metals forming insoluble phosphates, the gels have not been noted.

In preparation of the drilling fluid composition, the methods and procedures normally used for preparation of drilling fluid compositions with other additives are normally followed. The copolymer is added in a sufficient amount to effectively disperse the clay and other constituents in the drilling fluid and can be widely varied, similarly to the variation presently employed with chrome-containing drilling fluid additives, depending upon the formation being drilled and the depth of the well. The copolymer is generally compatible with other additives commonly used in drilling fluid compositions, such as weighting materials, water loss agents, and other additives that may be desired. If the phosphate or polyphosphate has not been previously intermixed with the copolymer, it may be added at this time by itself or with any of the other constituents.

The following Examples further illustrate the invention.

EXAMPLE I

A run was made where a lignosulfonate was reacted with 5% acrylic acid after which various amounts of sodium hexametaphosphate were added and the product tested as a dispersant in gypsum-containing drilling fluids.

A fermented calcium-based spent sulfite liquor was base exchanged to a sodium base by addition of sodium sulfate and precipitating the calcium as calcium sulfate. To 519 grams of the base exchanged spent sulfite liquor solution having a concentration of 48.2%, 12.5 grams of acrylic acid were added with 3.1 grams of 35% solution of hydrogen peroxide. The hydrogen peroxide was diluted with approximately an equal amount of water prior to addition. After mixing, the reaction mixture was digested on a boiling water bath for about 1 hour with occasional mixing. The reacted mixture was cooled and diluted to about 40% solids concentration. The product was then divided into increments of about 50 grams each of the original spent sulfite liquor solids. To three of the increments, 5, 7.5, and 12.5 grams, respectively, of sodium hexametaphosphate were added which represented 2.9, 4.2, and 7 weight percent of phosphorous based on the copolymer, and after mixing the products were spray dried. An increment was spray dried without the addition of the phosphate.

The four samples obtained above were tested in a gypsum-containing drilling fluid at an amount of 6 pounds per barrel and compared to results obtained against a control which was a commercial ferrochrome lignosulfonate sold under the trademark of Q-BROXIN. The gypsum-containing drilling fluid was obtained by adding 6 pounds per barrel of calcium sulfate (½ hydrate) to a fresh water drilling fluid. The tests made were similar to API standard test procedures for drilling fluids. The results obtained are shown in the Table below.

TABLE I

| Run | Phosphorous, % | IG | PV | Y | 10G | WL |
|---|---|---|---|---|---|---|
| 1 | 0 | 7.0 | 7.0 | 16.0 | 21.5 | 15.5 |
| 2 | 2.9 | 1.0 | 10.0 | 3.5 | 13.0 | 9.4 |
| 3 | 4.2 | 1.0 | 11.0 | 1.5 | 2.0 | 9.8 |
| 4 | 7.0 | 1.0 | 11.5 | 2.5 | 6.0 | 9.4 |
| Control | — | 1.0 | 10.5 | 3.5 | 5.0 | 11.4 |

EXAMPLE II

A run similar to that described in Example I was made where the base exchanged spent sulfite liquor was reacted with 15 weight percent acrylic acid in the presence of 3 weight percent of hydrogen peroxide, based upon the spent sulfite liquor solids. After preparation of the product, the reaction mixture was divided into five increments so that each increment contained approximately 50 grams of the original SSL solids. To one increment no phosphate was added but to the others different phosphate salts were added except to the last increment to which phosphoric acid and sodium hydroxide were added in proper proportions to obtain a pH of about 3.4. The increments were then spray dried and tested in gypsum and seawater-containing muds and a thermal stability test at 350° F. was also made. The phosphate salts were added in an amount equal to about 2.5 weight percent of the phosphorous, based upon the copolymer. In the tests made, the additive was used in an amount of 6 pounds per barrel for the gyp mud test, 3 pounds per barrel for the seawater drilling fluid, and the thermal tests were made using 8 pounds per barrel of the additive.

The following procedure was used for the thermal stability test. The sample in a specific amount was mixed into a fresh water mud and the mixture hot rolled at 150° F. for 20 hours at a pH of about 9.5. After the hot rolling, the sample was cooled and barium sulfate as a weighting agent was added in an amount to give a density of 16 pounds per gallon. The mixture was then mixed and hot rolled again for an additional 20 hours at 150° F. at a pH of about 9.5. After the second hot rolling, the sample was placed in a sealed metal container and heated at 350° F. for 22 hours. After heating, the sample was cooled and a shear test and mud tests similar to API standard test procedures for drilling fluids were made.

The results obtained are shown in Table II below compared to a control which was a commercial ferrochrome lignosulfonate drilling fluid additive as noted in Example I.

TABLE II

| Run | Phosphate Added | Gypsum Mud | | | | Seawater Mud | | | |
|---|---|---|---|---|---|---|---|---|---|
| | | IG | PV | Y | 10G | IG | PV | Y | 10G |
| 1 | No Phosphate | 18.0 | 8.0 | 26.0 | 35.0 | 8.0 | 10.5 | 16.0 | 44.0 |
| 2 | Sodium Hexametaphosphate | 1.0 | 10.5 | 2.0 | 3.0 | 6.5 | 9.0 | 9.0 | 24.0 |
| 3 | Sodium Pyrophosphate | 1.0 | 11.0 | 2.0 | 2.0 | 6.0 | 9.5 | 9.0 | 24.0 |
| 4 | Sodium Tripolyphosphate | 1.0 | 10.0 | 1.5 | 1.5 | 3.0 | 8.5 | 8.5 | 23.0 |
| 5 | Phosphoric Acid-Sodium Hydroxide | 1.0 | 11.0 | 2.0 | 1.5 | 5.0 | 9.5 | 9.5 | 22.0 |
| Control | — | 1.0 | 10.0 | 2.5 | 4.0 | 6.5 | 9.0 | 9.5 | 15.0 |

| | | Thermal Stability Test at 350° F. | | | | |
|---|---|---|---|---|---|---|
| | | Shear | IG | PV | Y | 10G |
| 1 | No Phosphate | 139 | 2.0 | 24.0 | 3.0 | 7.0 |
| 2 | Sodium Hexametaphosphate | 227 | 2.0 | 34.5 | 5.0 | 3.0 |
| 3 | Sodium Pyrophosphate | 195 | 2.0 | 37.0 | 5.0 | 3.0 |
| 4 | Sodium Tripolyphosphate | 185 | 2.0 | 36.5 | 5.5 | 3.0 |
| 5 | Phosphoric Acid-Sodium Hydroxide | 168 | 2.0 | 37.0 | 4.5 | 3.0 |
| Control | — | 166 | 13.0 | 25.0 | 24.0 | 51.0 | muds and also for thermal stability at 475° F. for 22 hours using the procedure described in Example II. The additive was used in an amount of 6 pounds per barrel in gyp mud, 3 pounds per barrel in seawater mud, and 15 pounds per barrel for the thermal stability test.

The results obtained are shown in the Table below where a ferrochrome lignosulfonate noted in Example I was used as a control for the gypsum and seawater drilling fluid, and for high-temperature stability tests at 475° F., a special chrome lignosulfonate prepared according to U.S. Pat. No. 3,686,119 for use at high temperatures was used for the control.

TABLE III

| Run | Gypsum Mud | | | | | Seawater Mud | | | |
|---|---|---|---|---|---|---|---|---|---|
| | IG | PV | Y | 10G | WL | IG | PV | Y | 10G |
| 1 | 1.0 | 15.5 | 3.0 | 3.0 | 7.4 | 4.0 | 8.0 | 8.0 | 23.0 |
| 2 | 1.0 | 16.5 | 3.5 | 2.5 | 7.2 | 3.0 | 9.0 | 7.5 | 22.0 |
| Control | 1.0 | 13.5 | 3.0 | 5.0 | 10.6 | 5.5 | 9.0 | 9.0 | 15.5 |

| | Thermal Stability Test at 475° F. | | | | | |
|---|---|---|---|---|---|---|
| | Shear | IG | PV | Y | 10G | WL |
| 1 | 353 | 7.0 | 43.0 | 36.0 | 76.0 | 6.6 |
| 2 | 273 | 4.0 | 40.5 | 22.5 | 24.0 | 6.0 |
| Control | 380 | 3.0 | 47.0 | 8.0 | 10.0 | 10.2 |

EXAMPLE III

A sodium-based spent sulfite liquor similar to that described in Example I was reacted with 25 weight percent acrylic acid in the presence of 1.7 weight percent of hydrogen peroxide in a procedure similar to that described in Example I. To two increments of the reaction mixture, each representing about 50 grams of the original spent sulfite liquor reacted, phosphoric acid was added in an amount to represent 1.5 weight percent phosphorous in one increment and 2.2% phosphorous in the second, based upon the copolymer. Sodium hydroxide was also added in proper proportion to maintain the reaction mixtures at a pH of about 3. The products were tested in gypsum and seawater-containing

EXAMPLE IV

Acrylamide in an amount of 10 grams was dissolved in 50 grams of water and added to 197 grams of a fermented spent sulfite liquor having a concentration of 50.8% solids. The fermented liquor was a calcium-based liquor. After addition of the acrylamide, 10.2 grams of 48.8% hydrogen peroxide were added and the sample was heated to about 75° while being stirred. The reaction became exothermic and the sample was maintained at a temperature of 75° to 85° for one hour, after which ferric sulfate dissolved in water was added and the sample heated for an additional hour at about 75° C. to convert the product to an iron salt containing about 9% iron. The reaction mixuture was at a pH of 3.1. The sample was cooled and filtered and the filtrate was freeze dried and a portion tested as a drilling mud additive in gyp mud and for thermal stability at 350° F. for 22 hours at 12 pounds per barrel of additive. The procedure used for the thermal stability test was similar to that described in Example II. The results obtained as compared to a ferrochrome lignosulfonate control are shown in Table IV below.

TABLE IV

| Run | Type Drilling Fluid | Additive #/bbl | Shear | PH | IG | 600 | 300 | PV | Y | 10G |
|---|---|---|---|---|---|---|---|---|---|---|
| Lignosulfonate-Acrylamide | Gypsum | 6 | — | 8.2 | 1.0 | 30.5 | 17.5 | 13.0 | 4.5 | 12.0 |
| Control | " | 6 | — | 8.1 | 1.0 | 24.5 | 13.5 | 11.0 | 2.5 | 4.0 |
| Thermal Stability Test at 350° F. | | | | | | | | | | |
| Lignosulfonate-Acrylamide | | 12 | 155 | 8.0 | 2.5 | 72.0 | 37.0 | 35.0 | 2.0 | 2.0 |
| Control | | 12 | 143 | 8.3 | 2.5 | 74.0 | 39.0 | 35.0 | 4.0 | 6.5 |

EXAMPLE V

A product was prepared where different water-soluble metal compounds were added to a reaction product of lignosulfonate and acrylic acid and the product tested in a drilling fluid containing non-swellable or contaminating clays.

A series of samples was prepared where a sodium-base spent sulfite liquor was reacted with 13% of acrylic acid using iron-hydrogen peroxide as the free radical initiator. After the polymerization of the acrylic acid with the lignosulfonate, manganese sulfate was added to the reaction mixture, and the mixture heated for 30 minutes at about 95°. The pH was then raised to 3 with sodium hydroxide and a portion of the product was spray dried.

The procedure similar to that above was repeated except that in place of manganese sulfate, zinc sulfate, copper sulfate, chromium sulfate, or iron sulfate were added, respectively. Also, a sample was prepared using titanium sulfate which was dissolved in strong sulfuric acid solution. After the addition of the titanium sulfate, the solution was neutralized with calcium hydroxide and the calcium sulfate filtered off. The clarified solution was then maintained at 95° for 30 minutes prior to spray drying.

The products above were evaluated by using the products as additives in a fresh water drilling fluid which had been contaminated with calcium-base non-swelling bentonite clays. The drilling fluid was prepared by mixing high-yield and low-yield bentonites of the type conventionally used in preparation of drilling fluids in an amount to represent clay solids in the drilling fluid of about 8.4 percent. The non-swelling clays were added in an amount of about 2.6% to obtain a drilling fluid which contains about 11% solids. The additives were added to the above drilling fluid in an amount of 4 pounds per barrel and the mixture hot rolled at 150° F. for about 20 hours. The additives were also tested with and without phosphate in a gypsum contaminated drilling fluid where 6 pounds per barrel of gypsum were added to a fresh water mud. The additives were added to the drilling fluid in an amount of 6 pounds per barrel. The results obtained are shown in Table V where the results were compared to using a lignosulfonate-acrylic acid copolymer as a sodium base without the presence of the heavy metals.

TABLE V

| | | | Clay Contaminated Drilling Fluid | | | | Gypsum Contaminated Drilling Fluid | | | | |
|---|---|---|---|---|---|---|---|---|---|---|---|
| Run | Metal | Amt. of Metal, Wt. % | IG | PV | Y | 10G | Amt. of Phosphorous, Wt. % | IG | PV | Y | 10G |
| 1 | Mn | 2.5 | 0.5 | 12.0 | 4.0 | 1.5 | 0 | 22.0 | 10.0 | 26.0 | 45.0 |
|   |    |     |     |      |     |     | 1.4 | 0.5 | 12.0 | 0 | 9.0 |
| 2 | Zn | 2.9 | 0.5 | 14.0 | 3.0 | 2.5 | 0 | 1.5 | 11.0 | 13.0 | 27.0 |
|   |    |     |     |      |     |     | 1.4 | 1.0 | 10.5 | 2.0 | 5.0 |
| 3 | Cu | 2.8 | 0.5 | 13.5 | 3.0 | 3.0 | 0 | 0.5 | 15.5 | 1.0 | 14.0 |
|   |    |     |     |      |     |     | 1.4 | 0.5 | 10.5 | 6.5 | 17.0 |
| 4 | Cr | 2.3 | 1.5 | 14.0 | 7.0 | 2.5 | 0 | 0.5 | 10.0 | 8.0 | 11.0 |
|   |    |     |     |      |     |     | 1.4 | 4.0 | 11.5 | 10.0 | 22.0 |
| 5 | Ti | 2.1 | 0.5 | 15.0 | 4.0 | 2.0 | 0 | 8.0 | 11.0 | 20.0 | 26.0 |
|   |    |     |     |      |     |     | 1.4 | 1.5 | 9.5 | 7.0 | 16.0 |
| 6 | Fe | 2.5 | 0.5 | 14.5 | 3.5 | 1.5 | 0 | 1.5 | 14.0 | 19.0 | 37.0 |
|   |    |     |     |      |     |     | 1.4 | 0.5 | 10.5 | 2.0 | 6.0 |
| 7 | Control | 0 | 1.5 | 15.5 | 6.5 | 15.0 | 0 | 16.0 | — | — | 37.0 |
|   |    |     |     |      |     |     | 1.4 | 2.5 | 12.5 | 16.0 | 37.0 |

EXAMPLE VI

A series of samples of a lignosulfonate-acrylic acid copolymer containing 13% acrylic acid was tested with phosphate, heavy metal, and with a mixture of phosphate and heavy metal in the clay contaminated mud system of Example V wherein additional contamination was added in an amount of 5 pounds per barrel of salt and 2 pounds per barrel of gypsum. The additives were used in an amount of 5 pounds per barrel. The constituents of the additives and the results obtained are shown in Table VI below.

TABLE VI

| Run | Amt. of Iron, Wt. % | Amt. of Phosphorous, Wt. % | Gypsum, Salt and Clay Contaminated | | | |
|---|---|---|---|---|---|---|
|   |   |   | IG | PV | Y | 10G |
| Control | 0 | 0 | 18.0 | 11.0 | 50.0 | 80.0 |
| 1 | 0 | 1.4 | 10.0 | 18.0 | 19.0 | 89.0 |

TABLE VI-continued

| Run | Amt. of Iron, Wt. % | Amt. of Phosphorous, Wt. % | Gypsum, Salt and Clay Contaminated | | |
|---|---|---|---|---|---|
| | | | IG | PV, Y | 10G |
| 2 | 1.0 | 0 | 19.0 | 20.0 32.0 | 71.0 |
| 3 | 10.0 | 0 | 8.0 | 20.0 25.0 | 90.0 |
| 4 | 1.5 | 1.4 | 1.5 | 17.0 10.0 | 50.0 |
| 5 | 2.5 | 1.4 | 1.5 | 15.0 9.0 | 36.0 |
| 6 | 3.5 | 1.4 | 1.0 | 18.0 7.0 | 22.0 |

EXAMPLE VII

A series of additives of a copolymer obtained by reacting lignosulfonate with 13 weight percent acrylic acid was also tested with phosphate, heavy metal, and both metal and phosphate for thermal stability at 400° F. in a drilling fluid similar to that described in Example II. The procedure used for the thermal test was similar to that described in Example II, except that the barium sulfate was added at the beginning of the test so the sample was hot rolled only once at 150° F. before being placed in the sealed metal container for aging at 400° F. for 22 hours. The additive was used in an amount of 12 pounds per barrel for the test. The constituents of the additives and the results obtained are shown in Table VII below.

TABLE VII

| Run | Amt. of Iron, Wt. % | Amt. of Phosphorous, Wt. % | Thermal Stability Test @ 400° F. | | | |
|---|---|---|---|---|---|---|
| | | | Shear #/100 Ft$^2$ | IG | PV | Y | 10G |
| Control | 0 | 0 | 125 | 1.5 | 37.5 | 7.5 | 2.5 |
| 1 | 0 | 1.4 | 50 | 1.5 | 38.0 | 4.0 | 2.0 |
| 2 | 2.5 | 0 | 190 | 1.5 | 41.0 | 4.0 | 5.0 |
| 3 | 10.0 | 0 | 360 | 3.0 | 31.0 | 23.0 | 67.0 |
| 4 | 1.5 | 1.4 | 115 | 2.0 | 38.0 | 9.0 | 2.5 |
| 5 | 2.5 | 1.4 | 125 | 1.5 | 38.5 | 6.5 | 1.5 |
| 6 | 3.5 | 1.4 | 125 | 1.5 | 41.0 | 5.0 | 3.5 |

I claim:

1. A water-base salt or gypsum containing drilling fluid comprising a suspension of a clay material and an effective dispersing amount of a mixture of a graft copolymer which is the water-soluble reaction product of lignosulfonate and an acrylic compound selected from the group consisting of acrylic acid, acrylonitrile, acrylamide, and methyl and ethyl esters of acrylic acid and a water-soluble phosphate compound which is a phosphoric acid, condensed phosphoric acid or salt thereof, said reaction product being prepared by reacting lignosulfonate with from 5 to 30% of the acrylic compound using a free radical initiator, said reaction product having a weight average molecular weight not exceeding 80,000 and said phosphate compound being present in an amount, expressed as phosphorous, in the range of from 0.5 to 5 weight percent of the reaction product.

2. A composition according to claim 1 wherein the drilling fluid composition contains gypsum.

3. A composition according to claim 1 wherein the drilling fluid composition is a seawater drilling fluid.

4. A composition according to claim 1 wherein the acrylic compound reacted with the lignosulfonate is acrylic acid.

5. A composition of claim 1 wherein the phosphate compound is an ammonium or alkali metal phosphate salt.

6. A composition according to claim 1 wherein the phosphate compound is an ammonium or alkali metal phosphate salt present in the range of from 1 to 3 weight percent of the reaction product, expressed as phosphorous.

7. A composition according to claim 6 wherein the acrylic compound is acrylic acid.

8. A composition according to claim 7 wherein the phosphate salt is sodium orthophosphate.

9. A water-base drilling fluid comprising a suspension of a clay material and an effective dispersing amount of a graft copolymer which is the water-soluble reaction product of lignosulfonate and an acrylic compound selected from the group consisting of acrylic acid, acrylonitrile, acrylamide, and methyl and ethyl esters of acrylic acid, combined with a water-soluble compound of a metal selected from the group consisting of iron, titanium, manganese, zinc, copper, and chromium, said reaction product being prepared by reacting lignosulfonate with from 5 to 30% of the acrylic compound using a free radical initiator, said reaction product having a weight average molecular weight not exceeding 80,000, said metal compound being combined with the reaction product in an amount such that at least 0.6 weight percent of the metal, based upon the reaction product is present, said drilling fluid further being contaminated with non-swelling clays or shales.

10. A composition according to claim 9 wherein the acrylic compound is acrylic acid.

11. A composition according to claim 9 wherein the metal is present in an amount up to 10 weight percent of the reaction product.

12. A composition according to claim 11 wherein the metal is iron.

13. A composition according to claim 11 wherein the metal is titanium.

14. A composition according to claim 11 wherein the metal is manganese.

15. A composition according to claim 11 wherein the metal is zinc.

16. A composition according to claim 11 wherein the acrylic compound is acrylonitrile.

17. A composition according to claim 11 wherein the acrylic compound is acrylamide.

18. A composition according to claim 11 wherein the metal is present in an amount of 1.5 to 3.5 weight percent of the copolymer.

19. A composition according to claim 18 wherein the acrylic compound is acrylic acid.

20. A composition according to claim 19 wherein the metal compound is iron.

21. A water-base drilling fluid comprising a suspension of a clay material and an effective dispersing amount of a mixture of a graft copolymer which is the water-soluble phosphate compound and a water-soluble reaction product of lignosulfonate and an acrylic compound selected from the group consisting of acrylic acid, acrylonitrile, acrylamide, and methyl and ethyl esters of acrylic acid, combined with a water-soluble compound which is a phosphoric acid, condensed phosphoric acid or salt thereof of a metal selected from the group consisting of iron, titanium, manganese, zinc, copper, and chromium, said reaction product being prepared by reacting lignosulfonate with from 5 to 30% of the acrylic compound using a free radical initiator, said reaction product having a weight average molecular weight not exceeding 80,000, said metal compound being combined with the reaction product in an amount such that at least 0.6 weight percent of the metal, based upon the reaction product, is present, and said phosphate compound being present in an amount of from 0.5 to 5 weight percent, expressed as phosphorous, based upon the reaction product.

22. A composition according to claim 21 wherein the acrylic compound is acrylic acid.

23. A composition according to claim 22 wherein the metal is iron.

24. A composition according to claim 21 wherein the phosphate is an ammonium or alkali metal phosphate salt present in an amount of 1 to 3 weight percent of the reaction product, expressed as phosphorous, and the metal is present in an amount of from 0.6 to 5 weight percent of the reaction product.

25. A composition according to claim 24 wherein the metal is iron.

26. A composition according to claim 24 wherein the metal is iron and the acrylic compound is acrylic acid.

27. A composition according to claim 24 wherein the metal is iron, the acrylic compound is acrylic acid, and the phosphate salt is sodium orthophosphate.

28. A composition according to claim 24 wherein the metal is zinc.

29. A composition according to claim 24 wherein the metal is zinc and the acrylic compound is acrylic acid.

30. A composition according to claim 24 wherein the metal is manganese.

31. A composition according to claim 24 wherein the metal is manganese and the acrylic compound is acrylic acid.

32. A composition according to claim 24 wherein the metal is titanium.

33. A composition according to claim 24 wherein the metal is titanium and the acrylic compound is acrylic acid.

34. A composition according to claim 24 wherein the metal is copper.

35. A composition according to claim 24 wherein the metal is chromium.

36. A process of drilling a well comprising circulating in the well, while drilling, a drilling fluid composition of Claim 1.

37. A process of drilling a well comprising circulating in the well, while drilling, a drilling fluid composition of claim 5.

38. A process of drilling a well comprising circulating in the well, while drilling, a drilling fluid composition of claim 8.

39. A process of drilling a well comprising circulating in the well, while drilling, a drilling fluid composition of claim 9.

40. A process of drilling a well comprising circulating in the well, while drilling, a drilling fluid composition of claim 11.

41. A process of drilling a well comprising circulating in the well, while drilling, a drilling fluid composition of claim 18.

42. A process of drilling a well comprising circulating in the well, while drilling, a drilling fluid composition of claim 19.

43. A process of drilling a well comprising circulating in the well, while drilling, a drilling fluid composition of claim 21.

44. A process of drilling a well comprising circulating in the well, while drilling, a drilling fluid composition of claim 27.

45. A process of drilling a well comprising circulating in the well, while drilling, a drilling fluid composition of claim 29.

46. A process of drilling a well comprising circulating in the well, while drilling, a drilling fluid composition of claim 33.

47. A process of drilling a well comprising circulating in the well, while drilling, at a temperature above 250° F., a drilling fluid composition of claim 8.

48. A process of drilling a well comprising circulating in the well, while drilling, at a temperature above 250° F., a drilling fluid composition of claim 20.

* * * * *

UNITED STATES PATENT AND TRADEMARK OFFICE
CERTIFICATE OF CORRECTION

PATENT NO. : 4,322,301
DATED : March 30, 1982
INVENTOR(S) : Kenneth A. E. Blackmore It is certified that error appears in the above—identified patent and that said Letters Patent is hereby corrected as shown below:

Table IV should read as follows:

TABLE IV

| Run | Type Drilling Fluid | Additive #/bbl | Shear | PH | 10 | 600 | 300 | PV | Y | 100 |
|---|---|---|---|---|---|---|---|---|---|---|
| Lignosulfonate-Acrylamide | Gypsum | 6 | --- | 8.2 | 1.0 | 30.5 | 17.5 | 13.0 | 4.5 | 12.0 |
| Control | " | 6 | --- | 8.1 | 1.0 | 24.5 | 13.5 | 11.0 | 2.5 | 4.0 |
| Thermal Stability Test at 350°F | | | | | | | | | | |
| Lignosulfonate-Acrylamide | | 12 | 155 | 8.0 | 2.5 | 72.0 | 37.0 | 35.0 | 2.0 | 2.0 |
| Control | | 12 | 143 | 8.3 | 2.5 | 74.0 | 39.0 | 35.0 | 4.0 | 6.5 |

Signed and Sealed this

Fifteenth Day of June 1982

[SEAL]

Attest:

GERALD J. MOSSINGHOFF

Attesting Officer — Commissioner of Patents and Trademarks